US012202268B2

(12) United States Patent
Miwa

(10) Patent No.: US 12,202,268 B2
(45) Date of Patent: Jan. 21, 2025

(54) LIQUID DISCHARGE HEAD AND LIQUID DISCHARGE APPARATUS

(71) Applicant: Keishi Miwa, Kanagawa (JP)

(72) Inventor: Keishi Miwa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 93 days.

(21) Appl. No.: 17/954,349

(22) Filed: Sep. 28, 2022

(65) Prior Publication Data

US 2023/0139963 A1 May 4, 2023

(30) Foreign Application Priority Data

Oct. 28, 2021 (JP) ................................. 2021-176427
Jul. 29, 2022 (JP) ................................. 2022-121491

(51) Int. Cl.
*B41J 2/14* (2006.01)

(52) U.S. Cl.
CPC ................................. *B41J 2/14233* (2013.01)

(58) Field of Classification Search
CPC ................ B41J 2/14233; B41J 2202/19; B41J 2202/20; B41J 2/161; B41J 2/1623
See application file for complete search history.

(56) References Cited

U.S. PATENT DOCUMENTS 6,206,499 B1 3/2001 Iijima et al.
2015/0124022 A1 5/2015 Luedeman et al.
2015/0171307 A1 6/2015 Masuda et al.
2016/0001556 A1 1/2016 Masuda et al.
2016/0031210 A1 2/2016 Kobayashi et al.
2017/0100934 A1 4/2017 Masuda et al.
2017/0157923 A1 6/2017 Koyano
2019/0275796 A1 9/2019 Miwa
2020/0298567 A1* 9/2020 Miyazaki .............. B41J 2/1433
2020/0298569 A1 9/2020 Miwa
2020/0298570 A1 9/2020 Masuda et al.
2021/0016568 A1 1/2021 Miwa
2021/0036208 A1 2/2021 Shimofuku et al.
2021/0162759 A1 6/2021 Miwa et al.
2021/0370675 A1 12/2021 Yoshita et al.

FOREIGN PATENT DOCUMENTS

JP 4-169238 6/1992
JP 2006-256029 A 9/2006
JP 2011-056922 3/2011
JP 2020-172050 10/2020

OTHER PUBLICATIONS

Extended European Search Report issued Mar. 2, 2023 in European Patent Application No. 22195841.6, 8 pages.

* cited by examiner

*Primary Examiner* — Lisa Solomon
(74) *Attorney, Agent, or Firm* — XSENSUS LLP

(57) ABSTRACT

A liquid discharge head includes: a nozzle plate having: a nozzle surface; and a nozzle in the nozzle plate, a liquid being discharged from the nozzle of the nozzle surface side in a liquid discharge direction; a nozzle protector covering at least a part of the nozzle surface of the nozzle plate other than the nozzle; a nozzle protector holder including a peripheral wall bonded to a peripheral end portion of the nozzle protector; and a resin member between an edge face of the peripheral end portion of the nozzle protector and an end surface of the peripheral wall facing the nozzle protector.

10 Claims, 7 Drawing Sheets

LIQUID DISCHARGE HEAD AND LIQUID DISCHARGE APPARATUS

CROSS-REFERENCE TO RELATED APPLICATIONS

This patent application is based on and claims priority pursuant to 35 U.S.C. § 119(a) to Japanese Patent Application No. 2021-176427, filed on Oct. 28, 2021, in the Japan Patent Office, and Japanese Patent Application No. 2022-121491, filed on Jul. 29, 2022, in the Japan Patent Office the entire disclosure of which are hereby incorporated by reference herein.

BACKGROUND

Technical Field

The present embodiment relates to a liquid discharge head and a liquid discharge apparatus.

Related Art

As liquid discharge apparatuses that discharge a liquid, there are known inkjet image forming apparatuses that discharge an ink onto a sheet such as paper to form an image.

Inkjet image forming apparatuses include a liquid discharge head having a nozzle to discharge the ink. When a sheet is conveyed to a position facing the liquid discharge head, the ink is discharged through the nozzle to form an image on the sheet. When the sheet comes into contact with the nozzle, the nozzle may be damaged, which may avoid stable ink discharge. Therefore, some inkjet image forming apparatuses include a nozzle protector that protects the nozzle.

SUMMARY

A liquid discharge head includes: a nozzle plate having: a nozzle surface; and a nozzle in the nozzle plate, a liquid being discharged from the nozzle of the nozzle surface side in a liquid discharge direction; a nozzle protector covering at least a part of the nozzle surface of the nozzle plate other than the nozzle; a nozzle protector holder including a peripheral wall bonded to a peripheral end portion of the nozzle protector; and a resin member between an edge face of the peripheral end portion of the nozzle protector and an end surface of the peripheral wall facing the nozzle protector.

According to the present embodiment, it is possible to suppress the separation of the nozzle protector.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
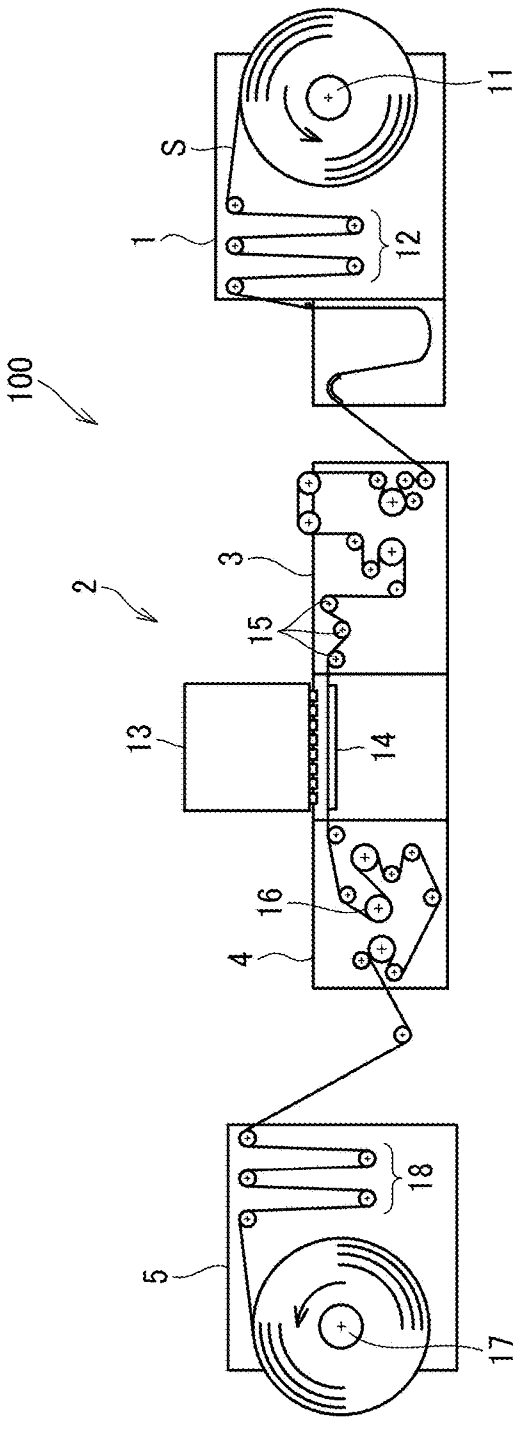
FIG. 1 is a diagram illustrating a general arrangement of an inkjet image forming apparatus according to an embodiment.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms “a”, “an”, and “the” are intended to include the plural forms as well, unless the context clearly indicates otherwise.

Embodiments will be described below with reference to the accompanying drawings. In each of the drawings for describing the embodiments, components such as members and elements having the same function or shape will be denoted by the same reference numeral as long as the components are distinguishable, and thus the description thereof will be omitted after the components are described once.

Figure 2:
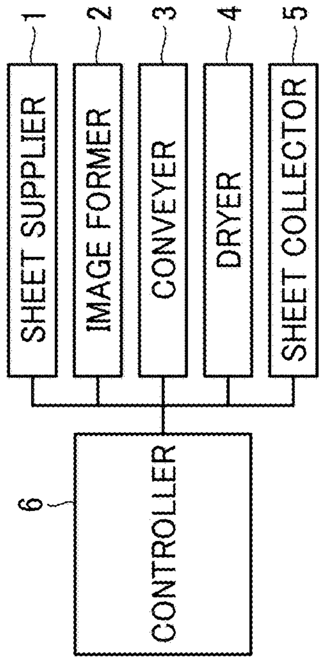
FIG. 2 is a block diagram illustrating a control system of the inkjet image forming apparatus according to the embodiment.

First, a configuration of an inkjet image forming apparatus, which is a liquid discharge apparatus according to an embodiment, will be described with reference to FIGS. 1 and 2. FIG. 1 is a diagram illustrating a general arrangement of the inkjet image forming apparatus, and FIG. 2 is a block diagram illustrating a control system of the inkjet image forming apparatus.

As illustrated in FIG. 1, an image forming apparatus 100 according to the present embodiment includes a sheet supplier 1 that supplies a sheet S for image formation, an image former 2 that forms an image on the sheet S, a conveyer 3 that conveys the sheet S to the image former 2, a dryer 4 that dries the sheet S, and a sheet collector 5 that collects the sheet S having an image formed thereon. The image forming apparatus 100 according to the present embodiment further includes a controller 6 (see FIG. 2) that controls the sheet supplier 1, the image former 2, the conveyer 3, the dryer 4, and the sheet collector 5.

The sheet supplier 1 includes a supply roller 11 having the elongated sheet S wound in roll form and a tension adjustment mechanism 12 that adjusts the tension applied to the sheet S. The supply roller 11 is configured to rotate in the direction of an arrow illustrated in FIG. 1 so that, as the supply roller 11 rotates, the sheet S is delivered. The tension adjustment mechanism 12 includes a plurality of rollers that has the sheet S placed therebetween to apply the tension. A part of these rollers is moved to adjust the tension of the sheet S. and the sheet S is delivered from the supply roller 11 at a constant tension.

The image former 2 includes a head unit 13, which includes a liquid discharge unit that ejects a liquid ink onto the sheet S. and a platen 14, which includes a sheet support member that supports the conveyed sheet S. The head unit 13 includes a plurality of liquid discharge heads. The ink is ejected from each of the liquid discharge heads onto the sheet S based on the image data generated by the controller 6 so that the image is formed on the sheet S. Here, the ink includes a liquid containing a color material, a solvent, and crystalline resin particles dispersed in the solvent. The crystalline resin includes a resin that undergoes a phase change and melts from a crystalline state to a liquid when heated above a predetermined melting point. The platen 14 is positioned so as to face the head unit 13 and support the lower surface of the sheet S supplied from the sheet supplier 1. The platen 14 is configured to be close to or away from the head unit 13 so that the distance between the head unit 13 and the sheet S may be kept constant.

The conveyer 3 includes a plurality of conveyance rollers 15. Each of the conveyance rollers 15 rotates while the sheet S is placed between the conveyance rollers 15, and thus the sheet S is conveyed to the image former 2. The conveyer 3 may also include other conveyers such as a conveyance belt.

The dryer 4 includes a heating drum 16 that heats the sheet S to promote drying of the ink on the sheet S. The heating drum 16 includes a cylindrical member that rotates while the sheet S is wound around the outer circumference thereof and has a heating source such as a halogen heater located inside. In addition to a contact heater such as the heating drum 16, a non-contact heater such as a warm air generation device that blows warm air to the sheet S may also be used as a heater that heats the sheet S.

The sheet collector 5 includes a collection roller 17 that winds and collects the sheet S and a tension adjustment mechanism 18 that adjusts the tension applied to the sheet S. The collection roller 17 is configured to rotate in the direction of an arrow illustrated in FIG. 1 so that, as the collection roller 17 rotates, the sheet S is wound and collected in roll form. The tension adjustment mechanism 18 includes a plurality of rollers, as in the tension adjustment mechanism 12 in the sheet supplier 1. A part of these rollers is moved to adjust the tension of the sheet S, and the sheet S is wound by the collection roller 17 at a constant tension.

The controller 6 includes an information processing apparatus such as a personal computer (PC). The controller 6 generates image data to be formed on the sheet S and controls various operations of the sheet supplier 1, the image former 2, the conveyer 3, the dryer 4, and the sheet collector 5. For example, the controller 6 controls the rotation speeds of the supply roller 11, the collection roller 17, and each of the conveyance rollers 15, and the temperature of the heating source that heats the heating drum 16.

Next, an example of the configuration of the liquid discharge head will be described with reference to FIGS. 3 and 4.

Figure 3:
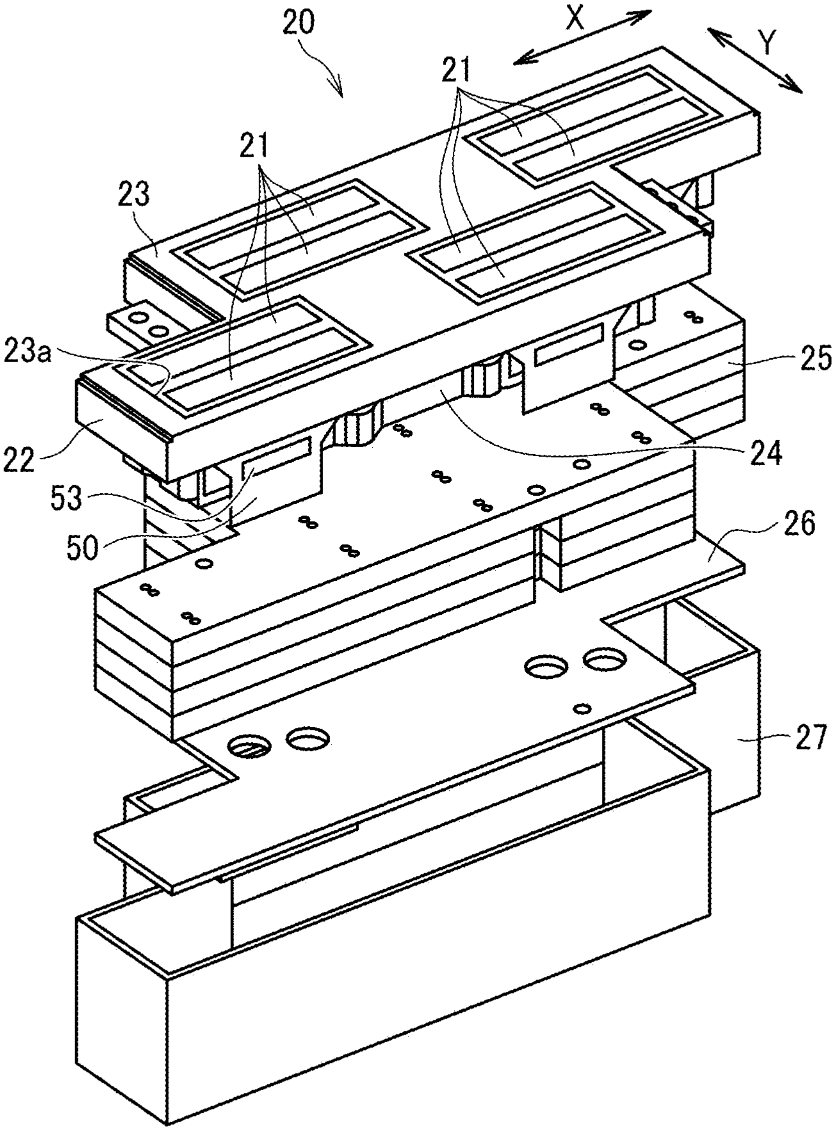
FIG. 3 is an exploded perspective view of an example of a configuration of a liquid discharge head.

FIG. 3 is an exploded perspective view of the liquid discharge head. FIG. 4 is a cross-sectional view of the liquid discharge head illustrated in FIG. 3 in the lateral direction (the direction of an arrow Y in FIG. 3).

As illustrated in FIG. 3, a liquid discharge head 20 includes a plurality of head main bodies 21, a base 22, a cover 23, a heat dissipation member 24, a manifold 25, a printed circuit board 26 (PCB), and a module case 27.

The head main bodies 21 are held by the base 22 as a holder. To attach the head main body 21 to the base 22, the head main body 21 is first inserted into an opening 22*c* (see FIG. 4) included in the base 22. Then, the head main body 21 is bonded to the cover 23 that is bonded to the base 22. The cover 23 includes a hole 23*a* (see FIG. 3) corresponding to each of the head main bodies 21 so that a peripheral portion of the head main body 21 is bonded to an edge of the hole 23*a*. Then, the head main body 21 is fastened and secured to the base 22 with a screw.

Specifically, a flange portion of a common channel member 35 (see FIG. 4) is provided on the front side and the back side of the head main body 21 in the longitudinal direction (the direction perpendicular to the paper surface of FIG. 4), and the flange portion is fastened to the base 22 with a screw.

Accordingly, the common channel member 35 is held by the base 22, and the head main body 21 is secured. The attachment structure of the head main body 21 and the base 22 is not limited thereto, and the head main body 21 may also be attached by bonding, swage, etc.

Figure 4:
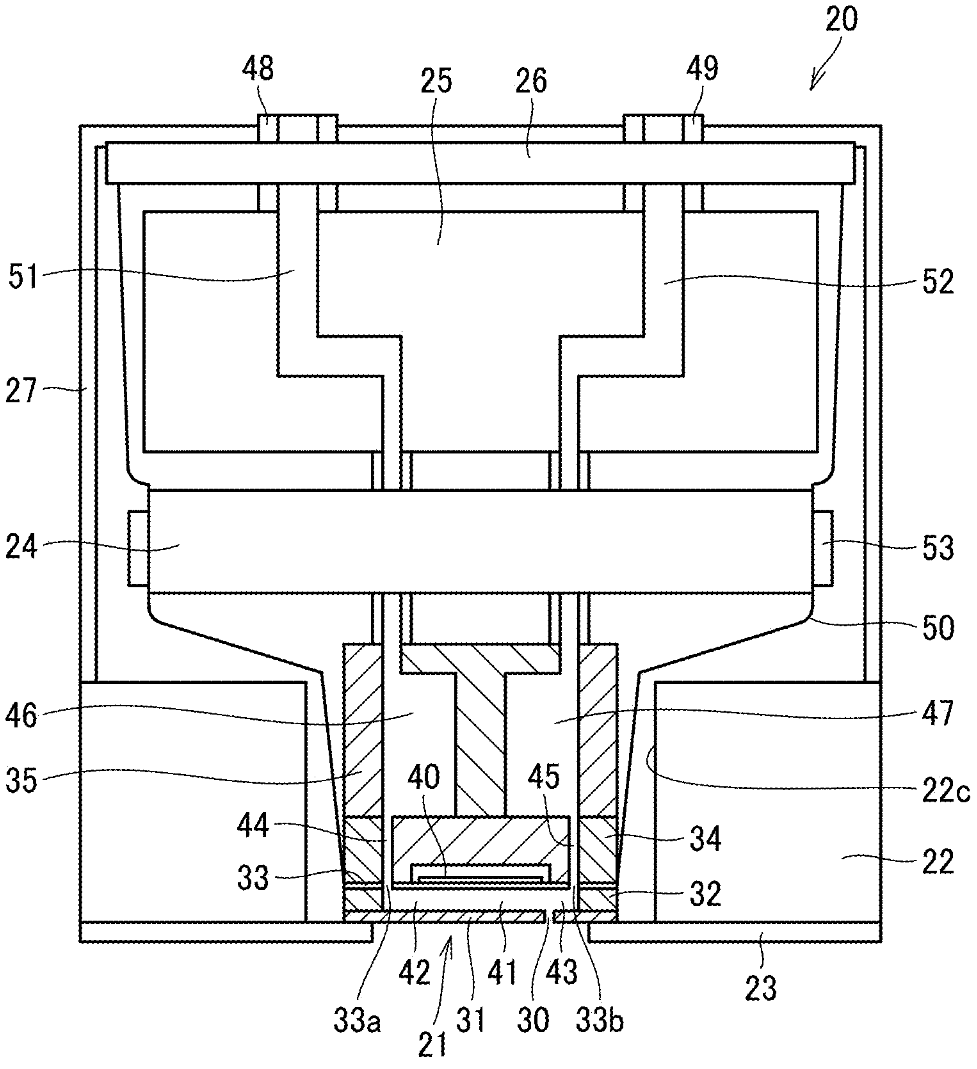
FIG. 4 is a cross-sectional view of the liquid discharge head illustrated in FIG. 3 in a lateral direction.

As illustrated in FIG. 4, the head main body 21 includes a nozzle plate 31 having a nozzle 30, a channel 32 including an individual chamber 41, or the like, communicating with the nozzle 30, a diaphragm 33 including a piezoelectric element 40, a holding 34 laminated on the diaphragm 33, the common channel member 35 stacked on the holding 34, etc. The common channel member 35 serves as a frame (nozzle protector holder) to hold the nozzle protector (cover 23). The individual chamber 41 is an example of a channel in the channel 32.

The channel 32 includes, in addition to the individual chamber 41, a supply-side individual channel 42 communicating with the individual chamber 41 and a collection-side individual channel 43 communicating with the individual chamber 41. The holding 34 includes a supply-side intermediate individual channel 44 communicating with the supply-side individual channel 42 through an opening 33*a* of the diaphragm 33 and a collection-side intermediate individual channel 45 communicating with the collection-side individual channel 43 via an opening 33*b* of the diaphragm 33.

The common channel member 35 (frame) includes a supply-side common channel 46 communicating with the supply-side intermediate individual channel 44 and a collection-side common channel 47 communicating with the collection-side intermediate individual channel 45. The supply-side common channel 46 communicates with a supply port 48 through a channel 51 in the manifold 25.

The collection-side common channel 47 communicates with a collection port 49 through another channel 52 in the manifold 25.

The PCB 26 is coupled to the piezoelectric element 40 of the head main body 21 through a flexible wiring member 50. The flexible wiring member 50 has a driver integrated circuit (IC) (drive circuit) 53 mounted thereon.

The base 22 preferably has a material having a low coefficient of linear expansion. Examples of the material having a low coefficient of linear expansion include 42 alloy, which is iron with nickel added, or Invar® materials. When the base 22 has such a material, an increase in the temperature of the base 22 due to the heat generated by the liquid discharge head 20 causes a small amount of expansion of the base 22, which is unlikely to cause a misalignment of the nozzle, and the misalignment of the ink discharge position may be suppressed. When the nozzle plate 31 and the diaphragm 33 include a silicon single-crystal and have the coefficient of linear expansion substantially the same as that of the base 22, the misalignment of the nozzle due to thermal expansion may be further reduced.

Figure 5:
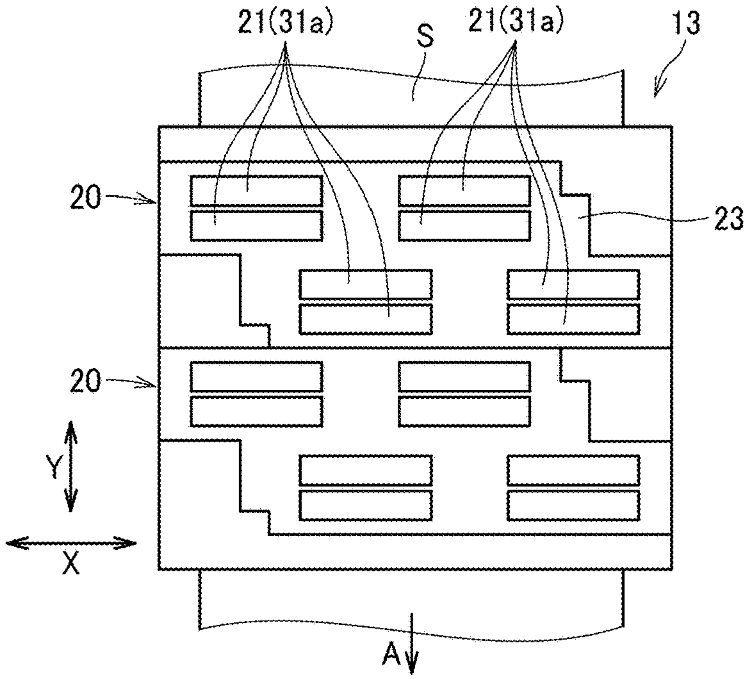
FIG. 5 is a plan view of an example of a configuration of a line head unit.

FIG. 5 is a plan view of an example of the configuration of the head unit.

In the example illustrated in FIG. 5, the head unit 13 includes the two liquid discharge heads 20. Each of the liquid discharge heads 20 is arranged such that the lateral direction thereof (the direction of the arrow Y) is in a sheet conveyance direction A and the longitudinal direction thereof (the direction of an arrow X) is in the direction perpendicular to the sheet conveyance direction A. Here, the "longitudinal direction" of the liquid discharge head 20 means, as illustrated in FIG. 5, the longitudinal direction (the direction of the arrow X) of the liquid discharge head 20 extending in one direction when the liquid discharge head 20 is viewed in a direction perpendicular to a nozzle surface 31*a* where the nozzle 30 (see FIG. 4) is exposed. The "lateral direction" of the liquid discharge head 20 means the direction (the direction of the arrow Y) perpendicular to the longitudinal direction of the liquid discharge head 20 when the liquid discharge head 20 is viewed in the direction perpendicular to the nozzle surface 31*a*. The "longitudinal direction" and "lateral direction" of the liquid discharge head 20 described in the description below also have the same meanings.

The head unit 13 illustrated in FIG. 5 includes what is called a line head unit. When the sheet S is conveyed to a position facing the head unit 13, the ink is ejected through the nozzle of each of the head main bodies 21 to form an image on the sheet S without moving the head unit 13 with respect to the conveyed sheet S.

In addition to the above-described line head unit, the head unit also includes what is called a serial head unit that ejects the ink while moving the liquid discharge head in the main scanning direction (sheet width direction).

Figure 6:
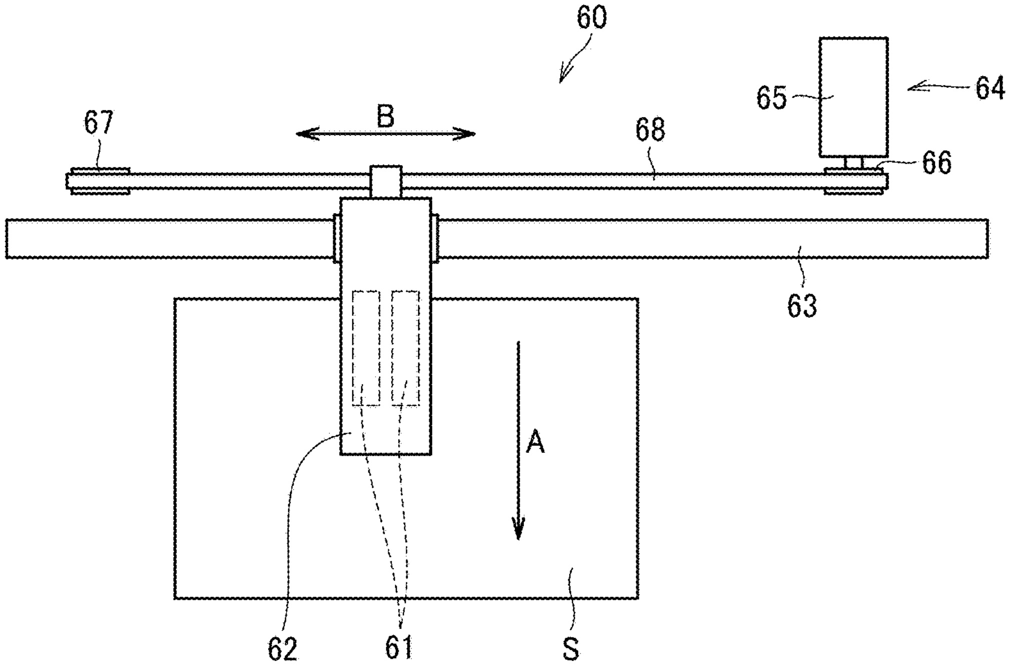
FIG. 6 is a plan view of an example of a configuration of a serial head unit.

FIG. 6 is a diagram illustrating an example of the configuration of a serial head unit 60. As illustrated in FIG. 6, the serial head unit 60 includes a carriage 62 including a liquid discharge head 61, a guide member 63 (guide rod) that guides the carriage 62 in the main scanning direction, which is a sheet width direction B, and a drive device 64 that moves the carriage 62.

The drive device 64 includes, for example, a motor 65, which includes a drive source, and a timing belt 68 that extends between a drive pulley 66 and a driven pulley 67. When the motor 65 is driven and the drive pulley 66 is rotated, the timing belt 68 moves circumferentially, and thus the carriage 62 moves in the main scanning direction along the guide member 63. The rotation direction of the motor 65 is switched between one direction and the opposite direction so that the carriage 62 may move back and forth in the main scanning direction.

In the above-described serial head unit 60, the liquid discharge head 61 ejects the ink in accordance with the image signal while the carriage 62 moves in the main scanning direction, and thus the image corresponding to one line is formed on the stopped sheet S. Then, while the sheet S moves by a predetermined amount in the direction of the arrow A in FIG. 6, the back-and-forth movement of the carriage 62 and the ink discharge are repeatedly performed to sequentially form images on the sheet S.

In the above-described head unit (liquid discharge head), as illustrated in FIG. 3, the cover 23 is provided around the head main body 21, and therefore, even when the sheet is conveyed close to the nozzle surface of the head main body 21, the contact of the sheet with the cover 23 may prevent the contact of the sheet with the nozzle surface. This may prevent damages to the nozzle and maintain stable ink discharge.

However, when the conveyed sheet hits an outer edge face 230 of the cover 23, the impact received by the cover 23 at that moment may cause the cover 23 to separate from the nozzle plate 31, the base 22 (see FIG. 4), or the like. In particular, when a fibrous conveyance object such as cloth is conveyed, the fuzzy fiber of the conveyance object gets stuck with the corner or burr of the cover 23, which easily separate the cover 23. When the cover 23 is separated, a foreign substance such as ink entering the head main body 21 through the separated area of the cover 23 may cause a failure or malfunction.

For example, when the ink enters inside through the separated area of the cover 23 and adheres to a current-carrying portion such as the flexible wiring member 50 (see FIG. 4) inside the head main body 21, a failure may occur due to current leakage. When the ink enters inside and adheres to the piezoelectric element 40 (see FIG. 4) inside the head main body 21, the subsequently solidified ink may avoid desirable driving of the piezoelectric element 40 and cause an ink discharge failure.

As described above, the separation of the cover 23 causes various disadvantages such as malfunction and failure. Therefore, the following measures are taken according to the present embodiment.

Figure 7:
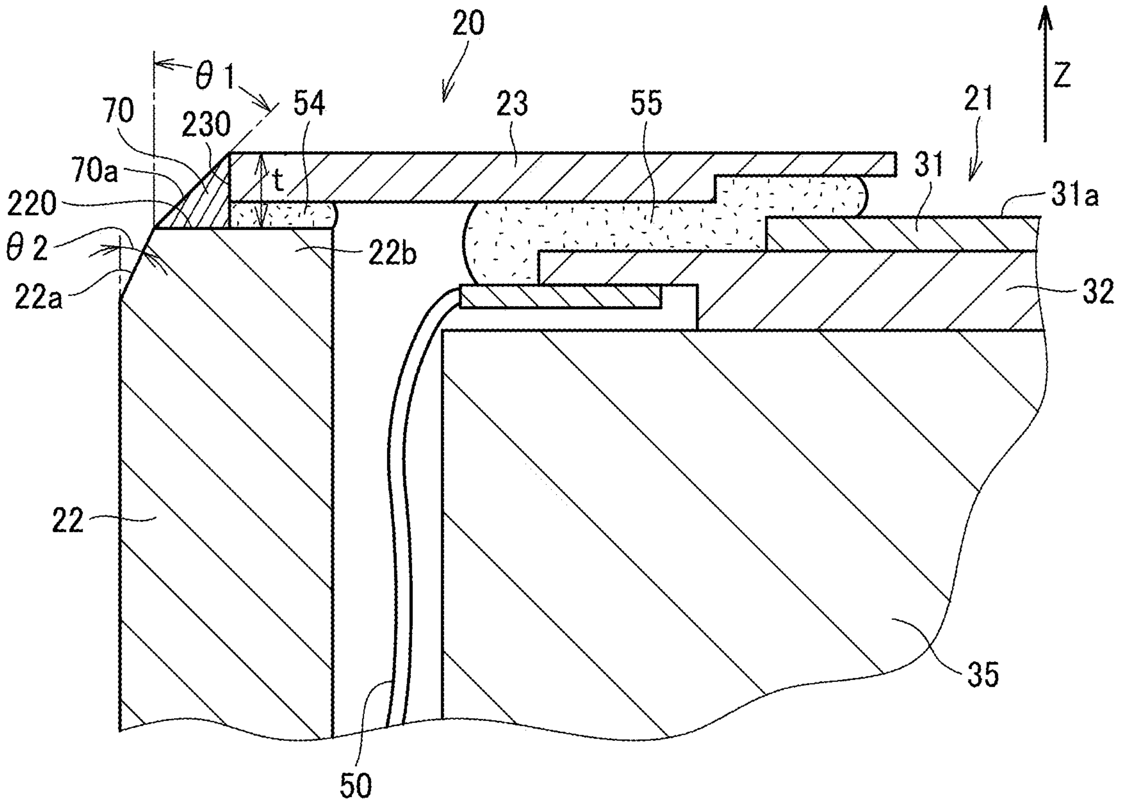
FIG. 7 is a schematic cross-sectional view of the liquid discharge head according to a first embodiment.

FIG. 7 is a schematic cross-sectional view of the liquid discharge head according to a first embodiment. As the basic structure of the liquid discharge head according to the present embodiment is substantially the same as the liquid discharge head illustrated in FIGS. 3 and 4 above, the description will be omitted as appropriate for the already described part.

As illustrated in FIG. 7, the liquid discharge head 20 according to the present embodiment includes the nozzle plate 31 having the nozzle 30 (see FIG. 4), the cover 23 serving as a nozzle protector that protects the nozzle 30, the channel 32 including a channel including the supply-side individual channel 42 (see FIG. 4), the collection-side individual channel 43 (see FIG. 4), and the like, the common channel member 35 serving as a frame, the base 22 serving as a holder that holds the common channel member 35, and the like. In FIG. 7, the base 22 also serves as a nozzle protector holder that holds the nozzle protector (cover 23).

In FIG. 7, the direction of an arrow Z indicates the liquid discharge direction in which the liquid (ink) is ejected through the nozzle of the nozzle plate 31. Specifically, in FIG. 7, the nozzle surface 31*a*, where the nozzle of the nozzle plate 31 is exposed, faces upward.

The cover 23 covers at least part of the nozzle surface 31*a* other than the nozzle. According to the present embodiment, the cover 23 covers the edge portion and its nearby portion of the nozzle surface 31*a*.

Here, when the center side (the right side in FIG. 7) of the nozzle surface 31*a* is "inner side" and the opposite side (the left side in FIG. 7) is "outer side", as illustrated in FIG. 7, a portion on the outer side of the cover 23 is bonded to the base 22 through an adhesive 54. The base 22 is provided around the nozzle plate 31, the channel 32, and the common channel member 35, and the portion on the outer side of the cover 23 is bonded to an end surface 220 of the base 22 facing in the liquid discharge direction Z.

As illustrated in FIG. 7, an upper portion of the base 22 includes a peripheral wall **22*b* arranged around the nozzle plate 31 and the channel 32, and the base 22 serves as a nozzle protector holder that holds the cover 23** (nozzle protector).

The portion on the inner side of the cover 23 is bonded to the nozzle plate 31 and the channel 32 through an adhesive 55. The channel 32 is bonded to the surface of the nozzle plate 31 (the lower surface of the nozzle plate 31 in FIG. 7) on the opposite side of the nozzle surface **31*a*, part of the channel 32 protrudes to the outer side from the edge portion of the nozzle plate 31, and the cover 23 is bonded to the outwardly protruding portion of the channel 32 and the edge portion periphery of the nozzle plate 31**.

As described above, the portions on both sides, the inner side and outer side, of the cover 23 are bonded to the respective members through the adhesives 54 and 55, and the space between each member and the cover 23 is sealed by the adhesives 54 and 55 to prevent the ink and other foreign matter from entering inside through the space. The cover 23 is bonded to the respective members through the adhesives 54 and 55, and therefore even when the conveyed sheet hits the cover 23, the cover 23 basically does not separate or fall off.

However, when the sheet repeatedly hits the outer edge face 230 of the cover 23 facing the outer side (the opposite side of the center side of the nozzle surface) or the fibrous sheet gets stuck with the edge (corner), burr formed on the edge of the outer edge face 230, or the like, while the sheet is conveyed from the left side in FIG. 7, the cover 23 may separate.

Therefore, according to the present embodiment illustrated in FIG. 7, a highly rigid resin member 70 is provided to cover the outwardly facing the outer edge face 230 of the cover 23, in other words, the outer edge face 230 (side surface) of the cover 23 on the side bonded to the base 22. Hereinafter, the side surface may be also simply referred to as the "edge face 230" or "side surface" for convenience.

Figure 8:
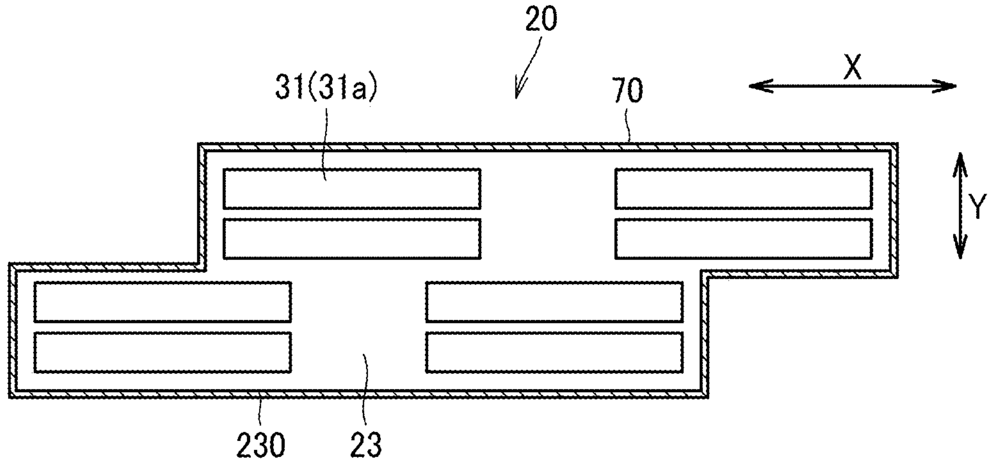
FIG. 8 is a plan view of the liquid discharge head according to the first embodiment.

The resin member 70 is provided between the outer edge face 230 of the cover 23 and the end surface 220 of the base 22 facing in the liquid discharge direction Z. As illustrated in FIG. 8, the resin member 70 is provided over the entire outer edge face 230 (hatched area in FIG. 8) of the cover 23.

As described above, according to the present embodiment, as the highly rigid resin member 70 is provided over the entire outer edge face 230 of the cover 23, the resin member 70 may prevent the sheet from coming into contact with and getting stuck with the outer edge face 230 of the cover 23. As the direct contact of the sheet with the outer edge face 230 of the cover 23 may be prevented, the impact on the cover 23 may also be reduced. Accordingly, the separation of the cover 23 is unlikely to occur, and therefore the entry of a foreign matter such as ink through the separated area may be suppressed. As a result, the possibility of malfunction and failure is reduced, and the reliability is improved.

As illustrated in FIG. 7, according to the present embodiment, the resin member 70 does not protrude in the liquid discharge direction Z beyond the outer edge face 230 of the cover 23 and does not protrude to the outer side (the opposite side of the center side of the nozzle surface) from the end surface 220 of the base 22 facing in the liquid discharge direction Z. This may also prevent the sheet from getting stuck with the resin member 70. The resin member 70 has an inclined surface **70*a* that is inclined toward the inner side (the center side of the nozzle surface or the side of the outer edge face 230 of the cover 23**) so as to gradually protrude in the liquid discharge direction Z.

Therefore, when the sheet comes into contact with the resin member 70, the sheet is guided along the inclined surface **70*a*. As described above, according to the present embodiment, even when the sheet comes into contact with the resin member 70, the sheet is guided without getting stuck, which may ensure stable and smooth sheet conveyance. As the resin member 70 has the inclined surface 70*a*, the impact when the sheet hits the resin member 70 (the inclined surface 70*a*) is also reduced. Thus, the effect of impact on the cover 23 may also be reduced, and the separation of the cover 23** may be further prevented.

According to the present embodiment, the base 22 also has an inclined surface **22*a*, as illustrated in FIG. 7. The inclined surface 22*a* is provided on a portion (an upper portion in FIG. 7) of the base 22 adjacent to the resin member 70 and is formed to be continuous with the inclined surface 70*a* of the resin member 70. The inclined surface 22*a* of the base 22 is inclined toward the inner side so as to gradually protrude in the liquid discharge direction Z, in the same manner as the inclined surface 70*a* of the resin member 70**.

According to the present embodiment, the inclined surfaces **22*a* and 70*a* of the base 22 and the resin member 70 have different inclination angles θ1 and 02 with respect to the liquid discharge direction Z. Specifically, the inclination angle θ1 of the inclined surface 70*a* of the resin member 70 is set to be larger than the inclination angle θ2 of the inclined surface 22*a* of the base 22. Accordingly, when the sheet comes into contact with the inclined surface 22*a* of the base 22, the sheet is smoothly guided from the inclined surface 22*a* of the base 22 to the inclined surface 70*a* of the resin member 70**, which enables stable and smooth sheet conveyance.

A height t (see FIG. 7) of the resin member 70 in the liquid discharge direction Z is preferably on the same level as the upper surface of the cover 23 in FIG. 7, but the height t may be lower than the upper surface of the cover 23 as long as the height t is higher than the lower surface of the cover 23. That is, the resin member 70 may cover at least part of the outer edge face 230 of the cover 23. Even when the resin member 70 covers part of the outer edge face 230 of the cover 23, the contact of the sheet with the outer edge face 230 may be suppressed, and the possibility of separation of the cover 23 may be reduced.

The highly rigid resin member 70 preferably has a Young's modulus of 1 GPa or more in terms of adhesion and strength. Furthermore, the resin member 70 preferably has a Young's modulus of 3 GPa or more. The Young's modulus, also called the modulus of longitudinal elasticity, is the slope with respect to the stress during tensile test obtained using the following Equation (1). In Equation (1), are presents tensile stress, E represents the Young's modulus (modulus of longitudinal elasticity), and c represents strain.

(Equation 1)

$$\sigma = E \times \varepsilon \quad (1)$$

According to the present embodiment, as illustrated in FIG. 8, the resin member 70 is provided over the entire outer edge face 230 of the cover 23, but when the contact area of the sheet with the outer edge face 230 is limited, the resin member 70 may also be provided at the contact area of the sheet (part of the outer edge face 230). For example, the resin member 70 may be provided, in the entire outer edge face 230 of the cover 23, on a portion extending in the longitudinal direction (the direction of the arrow X in FIG. 8) of the liquid discharge head 20 or a portion extending in the lateral direction (the direction of the arrow Y in FIG. 8) of the liquid discharge head 20.

Figure 12:
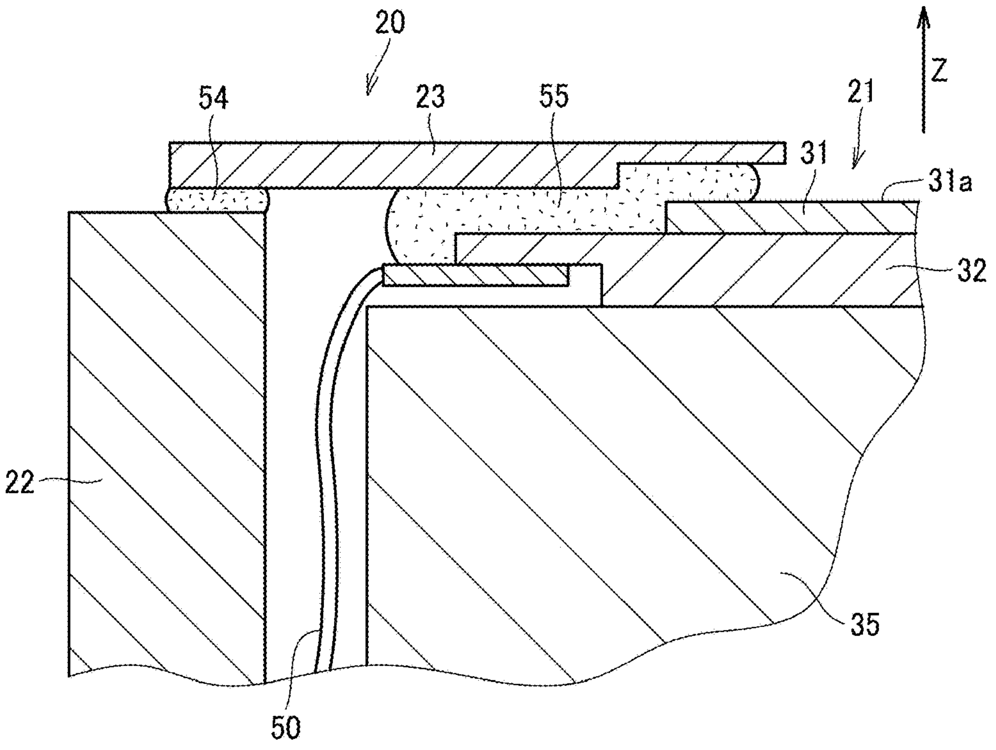
FIG. 12 is a schematic cross-sectional view of the liquid discharge head according to a comparative example.

In order to confirm the effect of the present embodiment, a comparative example illustrated in FIG. 12 was created, and an evaluation test for the comparative example and the present embodiment was conducted. The comparative example has the same configuration as that of the present embodiment except that the highly rigid resin member 70 and the inclined surface 22*a* of the base 22 are not included. In this test, the liquid discharge head according to the comparative example or the present embodiment was mounted on the image forming apparatus and the sheet was conveyed, and it was checked whether the cover 23 was separated.

As a result, in the comparative example, the cover 23 of some of the liquid discharge heads was separated and failed, and part of the cover 23 of the other liquid discharge heads was not failed but separated. Conversely, according to the present embodiment, the cover 23 was not separated at all. Thus, with the configuration according to the present embodiment, it was confirmed that the separation of the cover 23 was effectively suppressed.

Next, an embodiment different from the above-described embodiment (the first embodiment) will be described. In the description below, the parts different from the above embodiment will be primarily described, and the description of the other parts will be omitted as appropriate as the other parts have basically the same configuration.

Figure 9:
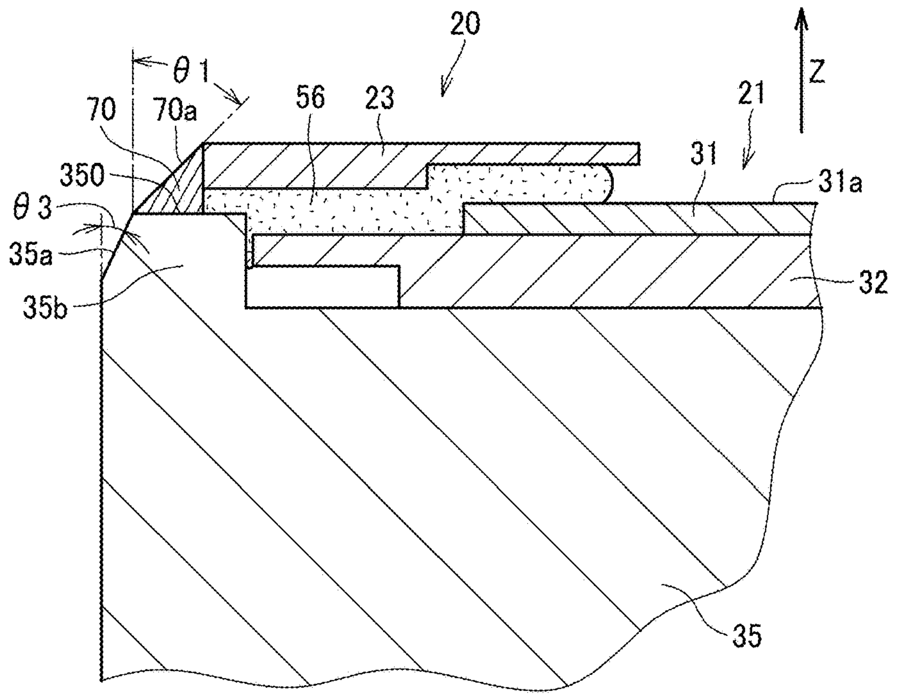
FIG. 9 is a schematic cross-sectional view of the liquid discharge head according to a second embodiment.

FIG. 9 is a schematic cross-sectional view of the liquid discharge head according to a second embodiment.

According to the second embodiment illustrated in FIG. 9, the base 22 (see FIG. 7) is not included. Therefore, according to the present embodiment, the cover 23 is bonded to the common channel member 35 (frame) instead of the base 22. Specifically, the common channel member 35 according to the present embodiment functions as a nozzle protector holder that is bonded to the cover 23 to hold the cover 23 (nozzle protector).

As illustrated in FIG. 9, a surface (upper surface in FIG. 9) of the common channel member 35 is bonded to a surface (lower surface in FIG. 9) of the channel 32 that is opposite to the surface (upper surface in FIG. 9) of the channel 32 bonded to the nozzle plate 31. Apart of the common channel member 35 includes a peripheral wall 35*b* disposed exterior of the nozzle plate 31 and the channel 32. The cover 23 is bonded to a surface 350 of the peripheral wall 35*b* facing in the liquid discharge direction Z through an adhesive 56.

According to the embodiment (the first embodiment) illustrated in FIG. 7 above, an upper portion of the base 22 in FIG. 7 in particular corresponds to a peripheral wall 22*b* arranged around the nozzle plate 31 and the channel 32, and the base 22 corresponds to the nozzle protector holder that holds the cover 23.

As described above, the second embodiment is different from the above-described embodiment in that the base 22 is not included and the cover 23 is bonded to the peripheral wall 35*b* of the common channel member 35, but even with this configuration, the cover 23 may separate when the sheet comes into contact with the outer edge face 230 of the cover 23.

Therefore, according to the present embodiment, as in the above-described embodiment, the highly rigid resin member 70 is provided to suppress the separation of the cover 23. Specifically, according to the present embodiment, the resin member 70 is provided between the outer edge face 230 of the cover 23 and the surface 350 of the peripheral wall 35*b* facing in the liquid discharge direction Z.

Thus, according to the present embodiment, too, the contact of the sheet with the outer edge face 230 of the cover 23 may be prevented, and the separation of the cover 23 may be suppressed. The range where the resin member 70 is provided may be the entire outer edge face 230 of the cover 23 or part of the outer edge face 230.

According to the present embodiment, too, the resin member 70 and the common channel member 35 (the peripheral wall 35*b*) have the inclined surface 70*a* and an inclined surface 35*a*, respectively. The inclined surfaces 70*a* and 35*a* are inclined toward the inner side so as to gradually protrude in the liquid discharge direction Z, and the inclination angle θ1 and an inclination angle θ3 with respect to the liquid discharge direction Z are set to have the same relation as that between the inclination angles θ1 and 02 of the resin member 70 and the base 22 according to the above-described embodiment.

That is, the inclination angle θ1 of the inclined surface 70*a* of the resin member 70 is set to be larger than the inclination angle θ3 of the inclined surface 35*a* of the common channel member 35. Therefore, according to the present embodiment, too, the sheet may be smoothly guided from the inclined surface 35*a* of the common channel member 35 to the inclined surface 70*a* of the resin member 70, and a reduction of the impact due to the contact of the sheet and stable and smooth sheet conveyance may be achieved.

Figure 10:
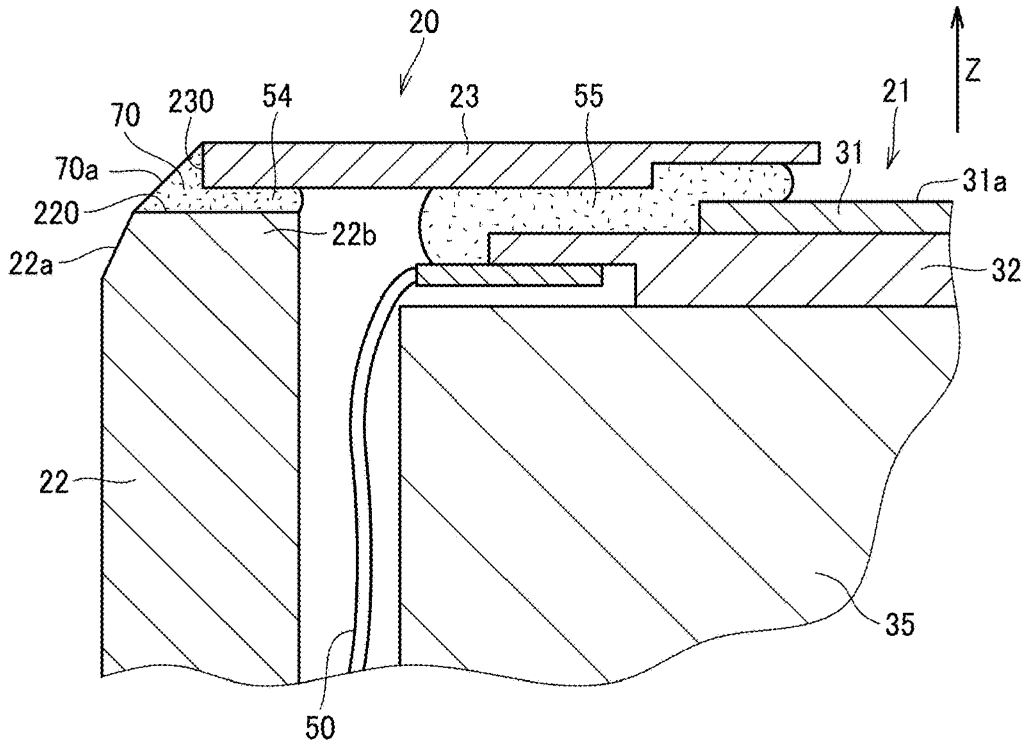
FIG. 10 is a schematic cross-sectional view of the liquid discharge head according to a third embodiment.

FIG. 10 is a schematic cross-sectional view of the liquid discharge head according to a third embodiment.

According to the third embodiment illustrated in FIG. 10, the resin member 70 covering the outer edge face 230 of the cover 23 includes the adhesive 54 that bonds the cover 23 and the base 22. When the rigidity of the adhesive 54 is high (the Young's modulus is 1 GPa or more), the adhesive 54 may be spread to the outer side beyond the cover 23, and the spread portion may include the resin member 70 covering the outer edge face 230 of the cover 23. The amount of the adhesive 54 to spread may be adjusted by changing at least one of the following: the adhesive application position, the amount of applied adhesive, and the pressure applied to bond the cover 23. The inclined surface 70*a*, which is the same as the one described above, may be formed in the resin member 70 by using methods such as forming the spread portion in a mold when the adhesive 54 is spread or cutting after the adhesive 54 is hardened.

The configuration according to the present embodiment is also applicable to the configuration without the base 22 as illustrated in FIG. 9 as well as the configuration including the base 22 as illustrated in FIG. 10.

That is, part of the adhesive 56 bonding the common channel member 35 and the cover 23 illustrated in FIG. 9 may include the resin member 70 covering the outer edge face 230 of the cover 23.

Figure 11:
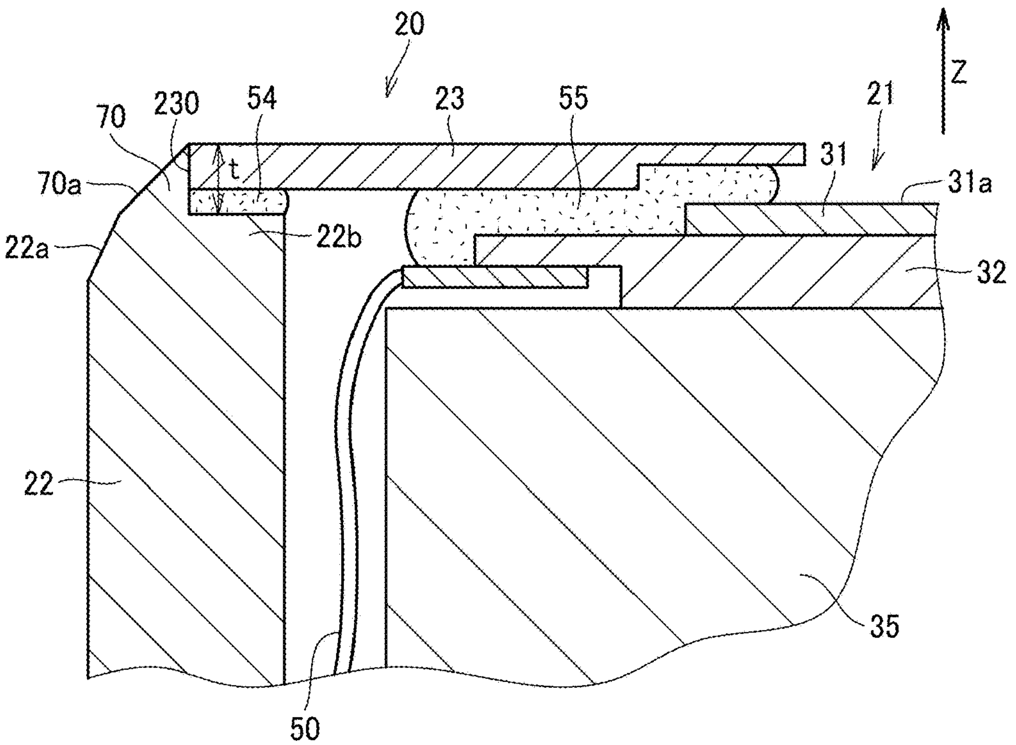
FIG. 11 is a schematic cross-sectional view of the liquid discharge head according to a fourth embodiment.

FIG. 11 is a schematic cross-sectional view of the liquid discharge head according to a fourth embodiment.

According to the fourth embodiment illustrated in FIG. 11, the resin member 70 covering the outer edge face 230 of the cover 23 is integrally formed with the base 22. When the base 22 is made of a resin material having high rigidity (Young's modulus of 1 GPa or more), part of the base 22 (at least part of the peripheral wall 22*b* illustrated in FIG. 11) may cover the outer edge face 230 of the cover 23. According to the present embodiment, too, as in each of the above embodiments, the contact of the sheet with the outer edge face 230 of the cover 23 may be suppressed, and thus the separation of the cover 23 is unlikely to occur.

The configuration according to the present embodiment is also applicable to the configuration without the base 22 as illustrated in FIG. 9 as well as the configuration including the base 22 as illustrated in FIG. 11.

That is, part of the common channel member 35 (the peripheral wall 35*b*) illustrated in FIG. 9 may include the resin member 70 covering the outer edge face 230 of the cover 23.

The present embodiment has been described above, but the present embodiment is not limited to the above-described embodiment and may be modified in design as appropriate without departing from the content of the present embodiment.

According to the present embodiment, the "liquid discharge head" includes a functional component that discharges or ejects the liquid through the nozzle. The discharged liquid is not limited in particular and may be any liquid as long as the liquid has a viscosity or surface tension that allows discharge from the head, but the viscosity is preferably 30 mPa-s or less under the normal temperature and pressure or due to heating or cooling. More specifically, the liquid includes a solution, suspension, emulsion, or the like, containing a solvent such as water or organic solvent, colorant such as dye or pigment, function-adding material such as polymerizable compound, resin, and surfactant, biocompatible material such as DNA, amino acid, protein, or calcium, and edible material such as natural colorant, and the liquid may be used for application such as inkjet ink, surface treatment liquid, component such as an electronic device or light emitting device, liquid for forming an electronic circuit resist pattern, material liquid for three-dimensional modeling, etc.

The liquid discharge head may include one head main body as well as a plurality of head main bodies as in the above-described embodiments.

An energy generation source that discharges the liquid may include the one using a piezoelectric actuator (laminated piezoelectric element and thin-film piezoelectric element), a thermal actuator using an electricity-heat conversion element such as a heating resistor, an electrostatic actuator including a diaphragm and a counter electrode, etc.

According to the present embodiment, the "liquid discharge unit" includes the integration of a liquid discharge head and a functional part or mechanism and includes an assembly of pans related to liquid discharge. For example, the "liquid discharge unit" includes the one combining the liquid discharge head and at least one of the configurations of the following: a head tank, a carriage, a supply mechanism, a maintenance mechanism, a main scanning movement mechanism, and a liquid circulation device.

Here, the integration includes, for example, securing the liquid discharge head and the functional part or mechanism by fastening, bonding, engagement, etc., or holding the liquid discharge head and the functional part or mechanism such that either one moves relative to the other one. The liquid discharge head and the functional pan or mechanism may also be configured to be attachable to or detachable from each other.

For example, the liquid discharge head and the head tank may be integrated as a liquid discharge unit. Furthermore, the liquid discharge head and the head tank may be coupled to each other via a tube, or the like, to be integrated. Here, a unit including a filter may also be added between the head tank and the liquid discharge head of the liquid discharge unit.

The liquid discharge head and the carriage may be integrated as a liquid discharge unit.

The liquid discharge head is movably held by a guide member included in part of a scanning movement mechanism so that the liquid discharge head and the scanning movement mechanism may be integrated as a liquid discharge unit. The liquid discharge head, the carriage, and the main scanning movement mechanism may be integrated.

A cap member, which is a part of the maintenance mechanism, is secured to the carriage to which the liquid discharge head is attached, so that the liquid discharge head, the carriage, and the maintenance mechanism may be integrated as a liquid discharge unit.

A tube is coupled to the liquid discharge head to which the head tank or channel component is attached so that the liquid discharge head and the supply mechanism may be integrated as a liquid discharge unit. The liquid in a liquid storage source is supplied to the liquid discharge head via the tube.

The main scanning movement mechanism also includes a guide member alone. The supply mechanism also includes a tube alone or a loader alone.

The "liquid discharge apparatus" includes an apparatus that includes a liquid discharge head or a liquid discharge unit and drives the liquid discharge head to discharge the liquid. The liquid discharge apparatus also includes an apparatus that discharges the liquid into air or liquid as well as an apparatus that may discharge the liquid to an object to which the liquid may adhere.

The "liquid discharge apparatus" may also include units regarding feeding, conveyance, and sheet ejection of an object to which the liquid may adhere and also a pre-processing apparatus, a post-processing apparatus, etc.

Examples of the "liquid discharge apparatus" include an image forming apparatus that discharges the ink to form an image on a sheet and a stereoscopic modeling apparatus (three-dimensional modeling apparatus) that discharges a modeling liquid onto a powder layer, which is obtained by forming powers in a layer form, so as to produce a stereoscopic model (three-dimensional model).

The "liquid discharge apparatus" is not limited to an apparatus to discharge liquid to visualize meaningful images, such as letters or figures. For example, the liquid discharge apparatus may be an apparatus to form arbitrarily images, such as arbitrarily patterns, or fabricate three-dimensional images.

The above-described "object to which the liquid may adhere" refers to a discharge object to which the liquid may adhere at least temporarily, such as the object to which the liquid is firmly fixed after adherence or the object which the liquid permeates after adherence. Specific examples include media such as sheets such as paper, recording paper, recording sheets, film, and cloth, electronic components such as electronic s and piezoelectric elements, powder layers (powdered layers), organ models, and inspection cells, and any object to which the liquid adheres unless otherwise specified.

The material of the above-described "object to which the liquid may adhere" may be any material as long as the liquid may adhere even temporarily, such as paper, yarns, fibers, woven fabrics, leathers, metals, plastics, glass, wood, and ceramics.

The "sheet" may also be a continuous sheet (e.g., roll paper) formed to be elongated or a sheet (e.g., cut paper) previously cut into a predetermined size. The present embodiment is also applicable to apparatuses that discharge the liquid to discharge objects other than sheets.

The "liquid discharge apparatus" includes an apparatus in which the liquid discharge head and the object to which the liquid may adhere are moved relative to each other, but is not limited thereto. Specific examples include a serial apparatus (see FIG. 6) that moves the liquid discharge head and a line apparatus (see FIG. 5) that does not move the liquid discharge head.

The "liquid discharge apparatus" further includes, for example, a treatment liquid application apparatus that discharges a treatment liquid onto paper to apply the treatment liquid to a surface of the paper for the purpose of modifying the surface of the paper, an ejection granulation apparatus that ejects a composition liquid, in which a raw material is dispersed in a solution, through a nozzle to granulate fine particles of the raw material.

[Aspect 1]

A liquid discharge head (20) includes: a nozzle plate (31) having: a nozzle surface (31*a*); and a nozzle (30) in the nozzle plate (31), a liquid being discharged from the nozzle (30) of the nozzle surface (31*a*) side in a liquid discharge direction; a nozzle protector (23) covering at least a part of the nozzle surface (31*a*) of the nozzle plate (31) other than the nozzle (30); a nozzle protector holder (22, 35) including a peripheral wall (22*b*, 35*b*) bonded to a peripheral end portion of the nozzle protector (23); and a resin member (70) between an edge face of the peripheral end portion of the nozzle protector (23) and an end surface (220) of the peripheral wall (35*b*) facing the nozzle protector (23).

[Aspect 2]

In the liquid discharge head according to Aspect 1, the resin member (70) includes an adhesive to bond the nozzle protector (23) and the nozzle protector holder (22, 35).

[Aspect 3]

The liquid discharge head according to any one of Aspect 1 to 2, further includes: a channel (32) having a first surface bonded to a bonding surface of the nozzle plate (31) opposite to the nozzle surface (31*a*), the channel (32) including a channel (41) communicating 1) with the nozzle (30). The nozzle protector holder (22, 35) includes a frame (35) bonded to a second surface of the channel (32) opposite to the first surface,

[Aspect 4]

The liquid discharge head according to any one of Aspect 1 to 2, further includes: a channel (32) having a first surface bonded to a bonding surface of the nozzle plate (31) opposite to the nozzle surface (31*a*), the channel (32) including a channel (41) communicating with the nozzle (30), and a frame (35) bonded to a second surface of the channel (32) opposite to the first surface. The nozzle protector holder (22, 35) includes a base (22) holding the frame (35).

[Aspect 5]

In the liquid discharge head according to any one of Aspect 1 to 5, the resin member (70) has a first inclined surface (70*a*) inclined toward the edge face of the peripheral end portion of the nozzle protector (23)

[Aspect 6]

In the liquid discharge head according to Aspect 5, the peripheral wall (35*b*) has a second inclined surface (22*a*) that is inclined toward the edge face of the peripheral end portion of the nozzle protector (23).

[Aspect 7]

In the liquid discharge head according to Aspect 6, a first inclination angle (θ1) of the first inclined surface (70*a*) of the resin member (70) with respect to the liquid discharge direction is larger than a second inclination angle (θ2) of the second inclined surface (22*a*) of the end surface (220) of the peripheral wall (22*b*) with respect to the liquid discharge direction.

[Aspect 8]

In the liquid discharge head according to any one of Aspect 1 to 7, the resin member (70) has a Young's modulus of 3 GPa or more.

[Aspect 9]

A liquid discharge apparatus includes the liquid discharge head according to any one of Aspect 1 to 8.

[Aspect 10]

A liquid discharge head (20) includes: a nozzle plate (31) having: a nozzle surface (31*a*); and a nozzle (30) in the nozzle plate (31), a liquid being discharged from the nozzle (30) of the nozzle surface (31*a*) side in a liquid discharge direction; a nozzle protector (23) covering at least a part of the nozzle surface (31*a*) of the nozzle plate (31) other than the nozzle (30); and a nozzle protector holder (22, 35) including a peripheral wall (35*b*) bonded to a peripheral end portion of the nozzle protector (23). At least apart of the peripheral wall (35*b*) is made of a resin member (70), and the peripheral wall (35*b*) covers the edge face of the peripheral end portion of the nozzle protector (23).

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A liquid discharge head comprising:

a nozzle plate having:

a nozzle surface; and a nozzle in the nozzle plate, a liquid being discharged from the nozzle of a nozzle surface side in a liquid discharge direction;

a nozzle protector covering at least a part of the nozzle surface of the nozzle plate other than the nozzle;

a nozzle protector holder including a peripheral wall bonded to a peripheral end portion of the nozzle protector; and a resin structure between an edge face of the peripheral end portion of the nozzle protector and an end surface of the peripheral wall facing the nozzle protector, the edge face of the peripheral end portion of the nozzle protector and the end surface of the peripheral wall forming an angle.

2. The liquid discharge head according to claim 1, wherein the resin structure includes an adhesive to bond the nozzle protector and the nozzle protector holder.

3. The liquid discharge head according to claim 1, further comprising:

a channel having a first surface bonded to a bonding surface of the nozzle plate opposite to the nozzle surface, the channel including a channel communicating with the nozzle, wherein the nozzle protector holder includes a frame bonded to a second surface of the channel opposite to the first surface.

4. A liquid discharge head comprising:

a nozzle plate having:

a nozzle surface; and a nozzle in the nozzle plate, a liquid being discharged from the nozzle of a nozzle surface side in a liquid discharge direction;

a nozzle protector covering at least a part of the nozzle surface of the nozzle plate other than the nozzle;

a nozzle protector holder including a peripheral wall bonded to a peripheral end portion of the nozzle protector;

a resin structure between an edge face of the peripheral end portion of the nozzle protector and an end surface of the peripheral wall facing the nozzle protector;

a channel having a first surface bonded to a bonding surface of the nozzle plate opposite to the nozzle surface, the channel including a channel communicating with the nozzle; and a frame bonded to a second surface of the channel opposite to the first surface, wherein the nozzle protector holder includes a base holding the frame.

5. A liquid discharge head comprising:

a nozzle plate having:

a nozzle surface; and a nozzle in the nozzle plate, a liquid being discharged from the nozzle of a nozzle surface side in a liquid discharge direction;

a nozzle protector covering at least a part of the nozzle surface of the nozzle plate other than the nozzle;

a nozzle protector holder including a peripheral wall bonded to a peripheral end portion of the nozzle protector; and a resin structure between an edge face of the peripheral end portion of the nozzle protector and an end surface of the peripheral wall facing the nozzle protector, wherein the resin structure has an inclined surface inclined toward the edge face of the peripheral end portion of the nozzle protector.

6. The liquid discharge head according to claim 5, wherein the peripheral wall has another inclined surface that is inclined toward the edge face of the peripheral end portion of the nozzle protector.

7. The liquid discharge head according to claim 6, wherein a first inclination angle of the first inclined surface of the resin structure with respect to the liquid discharge direction is larger than a second inclination angle of the another inclined surface of the peripheral wall with respect to the liquid discharge direction.

8. The liquid discharge head according to claim 1, wherein the resin structure has a Young's modulus of 3 GPa or more.

9. A liquid discharge apparatus comprising the liquid discharge head according to claim 1.

10. A liquid discharge head comprising:

a nozzle plate having:

a nozzle surface; and a nozzle in the nozzle plate, a liquid being discharged from the nozzle of a nozzle surface side in a liquid discharge direction;

a nozzle protector covering at least a part of the nozzle surface of the nozzle plate other than the nozzle; and a nozzle protector holder including a peripheral wall bonded to a peripheral end portion of the nozzle protector, wherein at least a part of the peripheral wall is made of a resin structure, and the peripheral wall covers an edge face of the peripheral end portion of the nozzle protector.

* * * * *